April 20, 1965 P. J. O'BRIEN 3,179,361
MIRROR AND EASEL THEREFOR
Filed May 23, 1963

INVENTOR
PHILIP J. O'BRIEN

BY *Charles R. Fay,*
ATTORNEY 3,179,361
MIRROR AND EASEL THEREFOR
Philip J. O'Brien, Ashby, Mass., assignor to Standard Pyroxoloid Corporation, Leominster, Mass., a corporation of Massachusetts
Filed May 23, 1963, Ser. No. 282,664
1 Claim. (Cl. 248—33)

This invention relates to a mirror having an easel which is adapted for holding the mirror upright, said easel being easily foldable to provide for placing the mirror flat upon the table or in a drawer, etc.

The principal object of the invention resides in the provision of a mirror having a frame which is preferably generally circular in shape although it may be provided with other similar shapes and having a generally semi-circular two-part easel pivoted thereto at diametrically opposed side edges thereof so that the mirror is capable of being adjusted to any desired position about a horizontal axis when the mirror is set upon a table or desk, and wherein said easel comprises a pair of complementary pivotable members which can come together into contacting condition for placing the mirror flat on a table, but which can be separated at a tangential point relative to the frame to provide a stand for the mirror.

Further objects of the invention include the provision of a special new and improved pivot attachment means for the easel members to the mirror frame, the easel members each including an abutment preventing spreading of the legs of the easel past a predetermined point, and including a molded plastic snap fastener means by which the easel is assembled with relation to the mirror frame very quickly and easily and substantially permanently although it may be taken apart under pressure.

The invention further relates to arrangements and combinations of parts which will be hereinafter described and more particularly set forth in the appended claims.

Reference is to be had to the accompanying drawings, in which.

Figure 1:
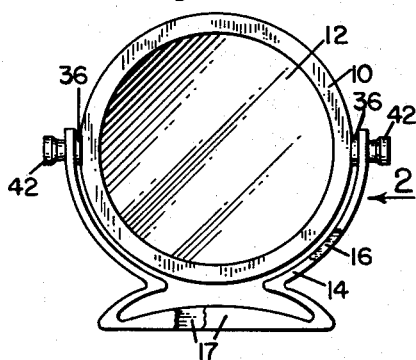
FIG. 1 is a view in front elevation illustrating the mirror.
Figure 2:
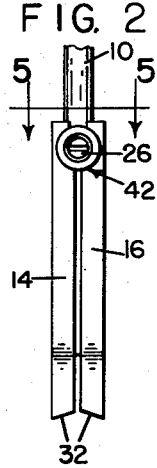
FIG. 2 is a view in side elevation thereof, looking in the direction of arrow 2 in FIG. 1 and showing the easel closed.
Figure 3:
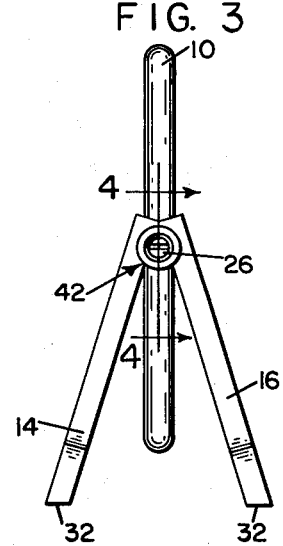
FIG. 3 is a view similar to FIG. 2 showing the easel open.

In illustrating the invention there is shown a generally circular frame 10 preferably and conveniently molded of plastic and holding a mirror 12 of conventional design. This frame 10 can of course be of any shape desired. To the frame there is attached a pivotable easel which comprises two separate generally semicircular leg members 14 and 16, these members being very similar in nature but having certain differences to be explained. These leg members 14 and 16 provide an easel which can be pivoted to the closed position shown in FIG. 2 whereby the entire mirror and easel can be laid flat, or these legs can be spread to a certain limited extent as shown in FIG. 3, providing a standup easel for the mirror by means of the base portions 17.

Figure 4:
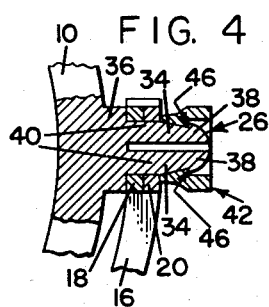
FIG. 4 is an enlarged section on line 4—4 of FIG. 3.
Figure 5:
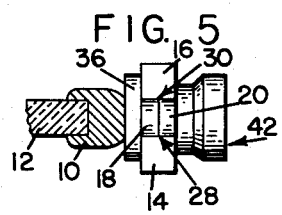
FIG. 5 is an enlarged section on line 5—5 of FIG. 2.
Figure 6:
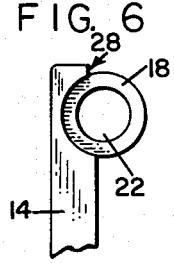
FIG. 6 is a fragmentary detail view illustrating the connection member for one of the legs of the easel.
Figure 7:
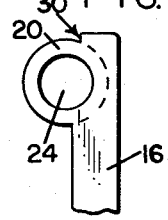
FIG. 7 is a similar view showing the complementary leg of the easel.

Each leg of the easel is provided at each end with an offset ring-like integral hinge member having a hole therein, this being illustrated as in FIGS. 6 and 7 at 18 and 20 respectively. These two members comprise but one-half the width of each leg 14 and 16 and interfit as best shown in FIGS. 4 and 5, the apertures at 22, 24 therein providing for swinging motion thereof on studs 26, these studs being integrally molded with the frame 10 at diametrically opposite points thereon. Each leg 14 and 16 is provided with end abutments 28, 30 which come together in the spread condition of the legs shown in FIG. 3 to prevent swinging of the legs 14 and 16 any further apart than as shown in this figure, and the base portion 17 of each leg is provided at its lower edge with inwardly slanted bottom surfaces as indicated at 32, these being coplanar when spread, thus providing a firm support for the mirror. The mirror frame can swing up about the axis of the studs 26.

Figure 8:
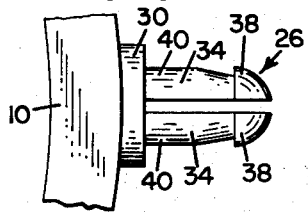
FIG. 8 is a view in elevation on a greatly enlarged scale illustrating a stud.

The stud construction is the same at each side of the mirror frame and therefore has been illustrated in detail in FIGS. 4 and 5 as to one side only. The stud is split, thus providing two springy finger members 34 which are slightly spaced. These fingers are molded integrally with the frame and extend in pairs from circular molded projections 36 against which the members 18 and 20 of the legs 14 and 16 are adapted to bear in assembled condition of the parts. At the free ends of studs 26, each is provided with a laterally outstanding rounded head 38, 38 forming an abutment or shoulder type of locking head; and inwardly thereof, i.e., to the left in FIG. 4, the stud surfaces flare out as clearly shown in the drawings in FIG. 8 merging into cylindrical areas 40, 40, receiving the overlapped members 18 and 20 of the legs 14 and 16.

Figure 9:
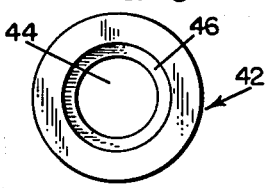
FIG. 9 is a view in elevation illustrating a snap button.

With the portions 18 and 20 of the legs arranged upon the cylindrical portions 40 of studs 26, by stretching the legs slightly apart and snapipng them over the studs into contact with the outer faces of the circular members 36, the heads 38 and the tapered portions adjacent the same are then exposed. A button generally indicated by the reference numeral 42 is snapped over the head of each stud and hold the parts in assembled condition. The buttons 42 are each provided with a central aperture as at 44 in FIG. 9 for this purpose, and have an interior tapered surface generally conforming to the tapered surfaces of the studs. Also an interior constriction forms an abutment at 46 and this snaps past the heads 38 holding the entire assembly in position.

It will be seen that once the parts have been molded, it is an extremely easy operation to assemble the easel to the mirror. The tapered portions of the interior of the buttons act as a guide so as to easily locate the same relative to the extending tapered or rounded head formed by the parts 38 of the studs, and the two-part easel is instantly convertible between the FIG. 2 and FIG. 3 positions thereof.

Having thus described my invention and the advantages thereof, I do not wish to be limited to the details herein disclosed, otherwise than as set forth in the claim, but what I claim is:

A combined mirror and easel construction adapted to be collapsed into substantially flat position for shipping purposes or to be set up with the easel disposed in a predetermined expanded position and with the mirror freely rotatable therein about a horizontal axis, said construction comprising a mirror frame having a mirror therein, said frame having a pair of oppositely disposed studs formed integral with the frame and split axially at their ends to form a pair of spring fingers and providing hinge pins to permit frictional relative rotation of said mirror with reference to the easel about a horizontal axis extending through said studs, said easel comprising a pair of like complementary hinged flat sided leg members adapted to be folded into collapsed position with the legs in contact with each other for shipping purposes or to be opened up to a predetermined extent when in use, said easel leg members each including at opposite ends thereof a pair of complementary ring shaped hinge members each integral with its respective leg and rotationally fitted and frictionally engaging said split studs of said mirror frame, said complementary ring shaped members on each side of the frame being of approximately one-half the thickness of the leg, and means retaining said ring members upon the split studs comprising cap members fitted over the outer ends of said stud fingers and frictionally engaging one of said complementary ring shaped hinge members, and coacting stop means carried by the respective leg members at a point above the ring shaped hinge members, for limiting the outward movement of said easel legs relative to one another.

References Cited by the Examiner

UNITED STATES PATENTS

| | | | |
|---|---|---|---|
| 1,750,118 | 3/30 | Mueller et al. | 40—125 X |
| 1,856,349 | 5/32 | Bigelow | 40—138 |
| 2,062,057 | 11/36 | Hobby | 40—202 |
| 3,019,501 | 2/62 | Kraus et al. | 24—213 |

FOREIGN PATENTS 620,265   1927   France.

FRANK L. ABBOTT, *Primary Examiner.*

CLAUDE A. LE ROY, *Examiner.*